United States Patent [19]

Brown et al.

[11] Patent Number: 4,933,133
[45] Date of Patent: Jun. 12, 1990

[54] CONTAINER CLOSURE AND METHOD FOR MANUFACTURE THEREOF

[76] Inventors: Edward M. Brown, 128 Passaic Ave., Livingston, N.J. 07039; Edward J. Towns, 40 Karen Way, Summit, N.J.

[21] Appl. No.: 193,260
[22] Filed: May 11, 1988
[51] Int. Cl.⁵ .............................................. B29C 45/44
[52] U.S. Cl. ...................................... 264/334; 264/318
[58] Field of Search ................................ 264/318, 334
[56] References Cited

U.S. PATENT DOCUMENTS

| | | | |
|---|---|---|---|
| 4,005,101 | 1/1977 | Nuch | 264/334 X |
| 4,767,587 | 8/1988 | Towns et al. | 264/334 X |
| 4,806,301 | 2/1989 | Conti | 264/334 |

FOREIGN PATENT DOCUMENTS

| | | | |
|---|---|---|---|
| 1043062 | 11/1978 | Canada | 264/318 |
| 2022063 | 12/1979 | United Kingdom | 264/318 |

Primary Examiner—John C. Fox
Attorney, Agent, or Firm—Charles E. Temko

[57] ABSTRACT

A container closure comprises a cylindrical molded utitary member defining a top panel and a skirt depending from the top panel to an open end for securement to the container, the skirt being interiorly tapered at the open end. The taper begins flush with the outer surface of the skirt and ends in a first circumference radially of the central axis of such cylinder. The skirt further defines a bead extending radially interiorly of the skirt to a second circumference radially closer to the cylinder central axis than the first circumference. The closure provides sealing retention pressure in accordance with the radially interior extent of the bead and exhibits evidence of initial removal from the container. The method for making the closure involves the use of a stripper plate to participate in part in defining a mold cavity.

5 Claims, 2 Drawing Sheets

FIG. 1.
FIG. 2.
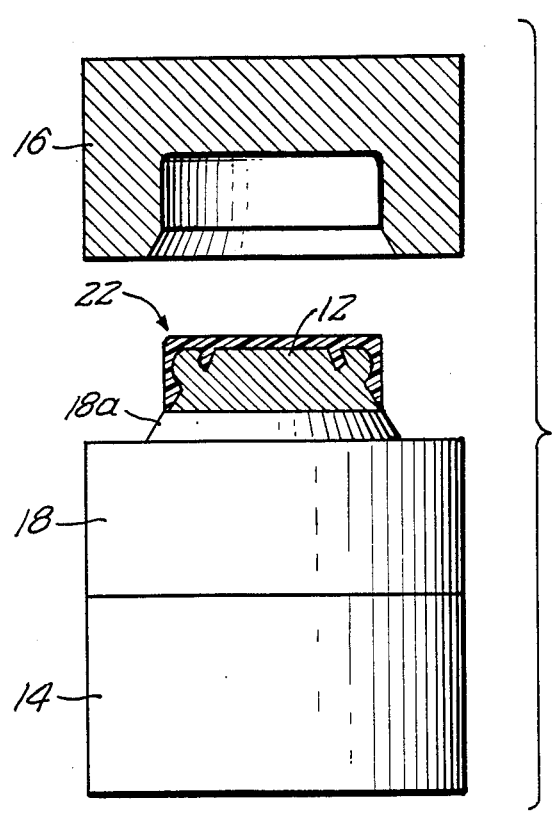
FIG. 3.
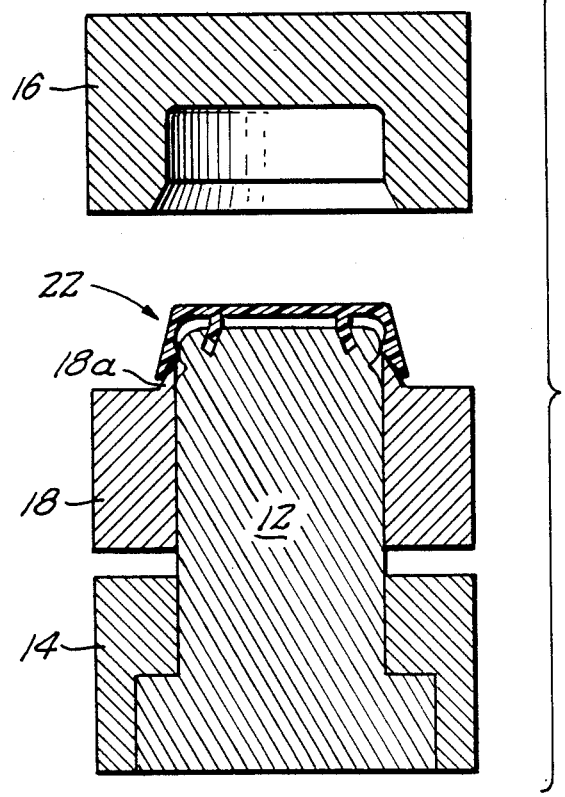
FIG. 4.
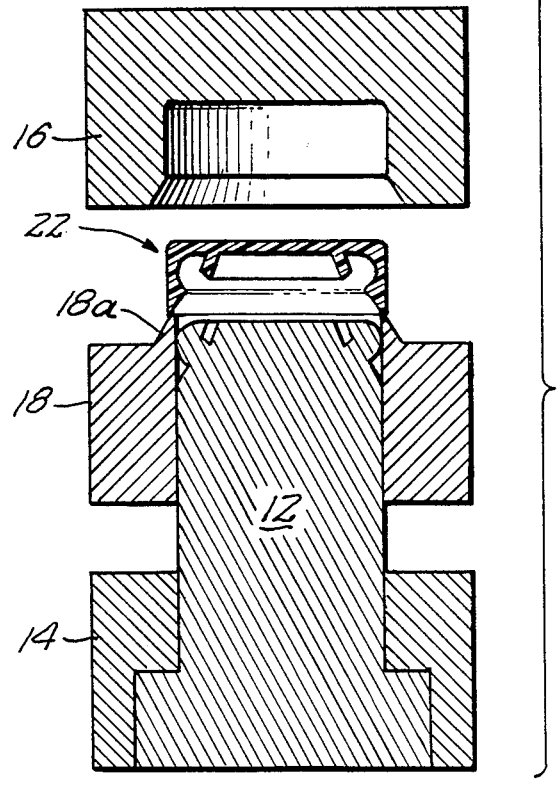

CONTAINER CLOSURE AND METHOD FOR MANUFACTURE THEREOF

FIELD OF THE INVENTION

This invention relates generally to the making of closures for containers and pertains more particularly to the manufacture of improved closures with tamper indication facility.

BACKGROUND OF THE INVENTION

A quite common container closure is referred to as a "crown" closure, by reason of its analogous appearance to the tiara or crown of royalty, being of frusto-conical shape and having a metal or plastic closure member with a top panel, a skirt depending from the top panel with exterior undulated surface and interior sealing means adapted for sealing engagement with the upper surface of the neck of a container.

The merits of such crown closures, and other related closures of simple structure such as straight skirt line closures which are essentially cylindrical in shape, are dependent largely upon their ability to maintain container pressurization existing at the time of their initial application to the container, and to withstand increased internal pressures in the container which, if in excess of the sealing retention capability of the closure, can give rise to leakage of pressurization of contained contents or actual liftoff.

Based on events of tampering over the past decade, giving rise to deaths of consumers, a further desired characteristic of crown and related simple closures is the facility for tamper indication. The prior art indicates various versions of the relatively complex structure of so-called "tamper-evident" closures of type leaving a telltale band separable from the closure upon the container in the course of initial opening thereof, and the somewhat simpler, see-through and closure member-activated, tine-type tamper-evident closure of various co-pending patent applications of applicants.

From applicants' viewpoint, presently known crown closures do exhibit levels of sealing of desired magnitude. However, being of metal, they are prone to rust and present an exterior with sharp edges, which can cut the hands. Also, they are not tamper-evident and can be removed and replaced without evidencing the same. A crimping operation is needed in initial application to a container to effect sealing.

Certain synthetic molded bottle closures are known which have internal beads cooperative with circumferential indentations on bottle necks. The greater the radially interior extent of such bead, the greater is the capacity for pressure retention. However, in the case of synthetic molded closures, the radially interior extent of such beads has been limited such that the molded closure may be removed or stripped from its forming core without damage to the bead and without need for collapsible forming cores, use of which entails increased expense and complexity in the making apparatus. It is clearly desirable to provide practice and structure which can increase the radially interior extent of sealing beads to thereby maximize sealing and pressure retention capability.

As above alluded to, tamper indication facility in simple closures is desirable. Heretofore known crown and related closures of simple construction do not exhibit such facility.

SUMMARY OF THE INVENTION

The present invention has as its primary object the provision of improved crown and related container closures of relatively simple construction.

A more particular object of the invention is the provision of closures of simple construction but exhibiting increased resistance to loss of initial container pressurization and which are tolerant of increases in container pressurization prior to initial opening thereof.

A quite specific object of the invention is the provision of improved closures of the simple structure variety with tamper indication facility.

In attaining the foregoing and other objects, the invention provides a method for making a container closure of type having a top panel and a skirt depending from said top panel, comprising a succession of steps as follows. A forming core is configured with exterior surface defining first interior surface of the closure. The core exterior surface includes a circumferential indentation for defining a bead in such first interior surface of the closure.

The forming core is encircled with a stripper plate, which is configured to define second interior surface of the closure continuous with the first interior surface thereof.

A molding housing is configured to have interior surface corresponding to the exterior surface of the closure, to be engageable with the stripper plate and to be cooperative with the stripper plate and the forming core to define therewith a molding cavity for the closure.

The stripper plate and the molding housing are placed in engagement, with the stripper plate encircling the forming core. Molding material is injected into the cavity to form the closure on the core.

The molding housing is removed from engagement with the stripper plate to expose the formed closure for removal from the core.

The stripper plate is displaced relative to the forming core, thereby displacing the skirt of the closure radially outwardly to release the bead from the forming core indentation.

In particularly preferred practice, the stripper plate is configured with a conical outer surface to define an interior taper as the closure second interior surface. In such practice, the stripper plate so encircles the forming core as to place such conical outer surface of the stripper plate contiguously with the forming core exterior surface.

The forming core exterior surface further desirably includes a portion for forming a sealing member in the closure. To this purpose, the forming core exterior surface may include a conical recess at an end of the forming core to form a conical sealing member in the closure.

A particularly preferred closure in accordance with the invention issuing from the above-discussed practices comprises a cylindrical molded unitary member defining a top panel and a skirt depending from the top panel to an open end for securement to the container, the skirt being interiorly tapered at the open end. The taper begins flush with the outer surface of the skirt and ends in a first circumference radially of the central axis of such cylinder. The skirt further defines a bead extending radially interiorly of the skirt to a second circumference radially closer to the cylinder central axis than the first circumference.

Such tapered surface of the skirt serves to displace the skirt radially outwardly in the course of stripping the closure from a forming core to thereby facilitate release of the bead from the forming core.

In preferred practice, selection is made of the angle of the taper to the vertical, i.e., relative to the cylinder central axis, to thereby select horizontal and vertical forces to be imposed in the course of the stripping operation. The greater the vertical angle, the greater is the horizontal stripping force component, and hence the larger can be the radially interior extent of the bead and hence the greater the sealing retention pressure to be attained.

In a described preferred embodiment, the vertical angle is selected to be about thirty degrees with a particularly high horizontal stripping force component exerted upon the skirt, effecting a substantial opening or flowering of the closure in the course of stripping and release of a quite large radially extending bead from the forming core.

Attendant to the increased radial extent of the sealing bead, removal of the closure thus formed from a container gives rise to a visible disruption of the lower portion of the skirt, since removal occasions movement of the bead out of the bottle neck indentation and consequent stress in the lower portion of the skirt of the closure, thus providing tamper indication, i.e., indication by closure structure visible to the user, of the fact of the occurrence of the initial closure opening.

Based on the involvement of the stripper plate in forming such tapered surface of the closure and such radially outward displacement of the closure skirt and the use of the bead to enhance retaining of the closure with the forming core, the radial intrusion of the bead into the closure interior is vastly enhanced, giving rise to increase of retention of pressurization, a measure desired in the art, as above discussed.

The foregoing and other objects and features of the invention will be further understood from the ensuing detailed description of preferred embodiments and practices and from the drawings wherein like reference numerals identify like parts and components throughout.

DESCRIPTION OF THE DRAWINGS

FIG. 1 is a showing of apparatus for making a closure in accordance with the invention in first, closure making state, with components shown in section and removed in part.

FIG. 2 is a schematic showing of such closure making apparatus in second state wherein the upper molding housing is displaced to expose the formed closure for removal from its forming core.

FIG. 3 is a schematic showing of such closure making apparatus in third state wherein first relative movement has occurred as between the stripper plate and the forming core.

FIG. 4 is a schematic showing of such closure making apparatus in fourth state wherein second relative movement has occurred as between the stripper plate and the forming core, fully releasing the closure therefrom.

DETAILED DESCRIPTION OF PREFERRED EMBODIMENTS AND PRACTICES

Figure 5:
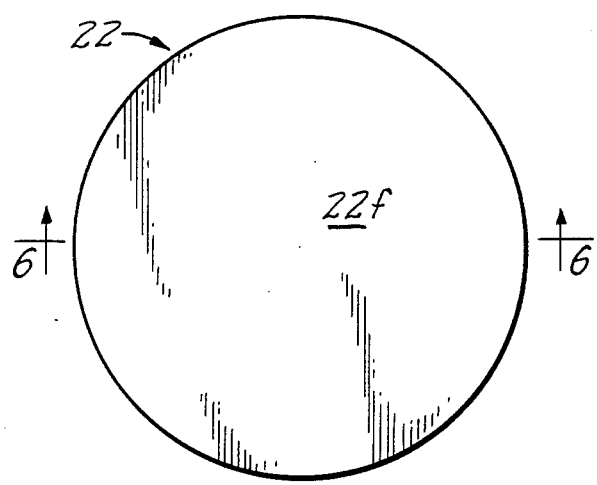
FIG. 5 is an enlarged top plan elevation of a closure in accordance with the invention.

Referring to FIG. 1, closure making apparatus 10 includes forming core 12, forming core displacement member 14, upper molding housing 16 and stripper plate 18. Housing 16 and member 14 are shown centrally sectioned and stripper plate is shown sectioned and broken away in part, with forming core being shown in full.

Molding cavity 20 is defined in FIG. 1, and is bounded by upper molding housing 16, stripper plate cone 18a and core exterior surface upwardly of ledge 12a. Molding material injection passage 16a is formed in upper molding housing 16 and is in communication with cavity 20.

Figure 6:
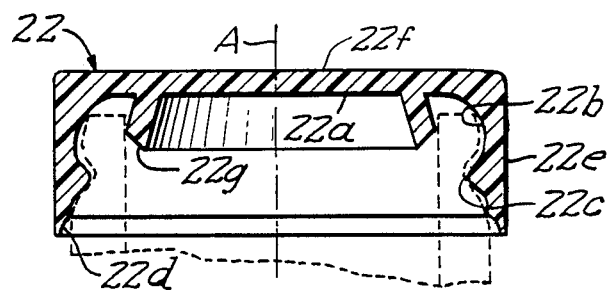
FIG. 6 is a sectional elevation of the FIG. 5 closure as would be seen from plane VI—VI of FIG. 1, with a bottle neck being shown in phantom.

Refering jointly to FIGS. 1 and 6, forming core 12 is configured with such exterior surface above ledge 12a to define first interior surface of closure 22, comprising top panel undersurface 22a, interior skirt wall 22b and bead. 22c. Stripper plate 18 cone 18a forms second interior surface of closure 22, comprising interior skirt tapered wall section 22d.

As is seen in FIG. 1, forming core 12 is encircled by stripper plate 18 and the forming core surface above ledge 12a is contiguous with stripper plate conical surface 18a. The stripper plate is centrally open to receive forming core 12.

Upper molding housing 16 is configured to have interior surface corresponding to the exterior surface of the closure, to be engageable with stripper plate 18 and to be cooperative with both stripper plate 18 and forming core 12 to define therewith molding cavity 20 for the closure. Stripper plate 18 and forming core 12 together comprise a lower molding housing.

Stripper plate 18 and upper molding housing 16 are placed in engagement, as shown in FIG. 1, with stripper plate 18 encircling the forming core. Molding material is injected into cavity 20 through injection passage 16a to form the closure on the forming core and the upper portion of stripper plate conical surface 18a.

Referring now to FIG. 2, closure 22 is shown formed on forming core 12 and stripper plate 18 and upper molding housing 16 is shown displaced upwardly of the formed closure, exposing same for removal from making apparatus 10. In this view, displacement member 14 and stripper plate 18 are shown full, upper molding housing 16 is shown centrally sectioned and forming core 12 is shown centrally sectioned, as is closure 22.

With FIGS. 1 and 2 representing respective first and second successive making stages, FIG. 3 depicts a third stage wherein forming core 12 is moved downwardly by displacement member 14, while stripper plate 18 remains stationary, i.e., in its FIG. 2 disposition. Such first relative movement of forming core 12 relative to stripper plate 18 occasions advance of stripper plate conical surface 18a upwardly along taper 22d of closure 22 into engagement with bead 22c thereof. During such activity, which occurs during a time period preceding the FIG. 3 showing, closure 22 is precluded from upward movement relative to the forming core by reason of engagement of bead 22c and the corresponding indentation of forming core 12 surface above ledge 12a. During such time period, by reason of engagement of stripper plate cone 18a and taper 22d, and such retention of the closure on the core, stripper plate 18 expands skirt 22e radially outwardly to the ultimate disposition shown in FIG. 3. Such displacement of the skirt is generally pivotal about the juncture of the skirt and top panel 22f and is effective in freeing bead 22c from residence in the corresponding forming core indentation, despite that bead 22c is of extensive radial intrusion into the interior of closure 22, beyond the radial extent heretofore observed seen in known such retention beads.

In FIG. 3, such time period has expired and it is seen that bead 22c is essentially free of capture by the forming core indentation. By reason of the skirt pivotal movement about the closure top panel, it is also seen that the stripping operation is carried out without disruption of the configuration of bead 22c.

Applicants' teaching in this respect is to effect desired horizontally outward forces during the stripping operation to so open the formed closure to permit undamaged release of the closure bead from the forming core. Increase in angle B (FIG. 6) will increase horizontally outward forces as desired.

Referring to FIG. 4, stripper plate 18 is shown in its FIG. 3 disposition, and forming core 12 has been displaced downwardly by displacement member 14 from its FIG. 3 disposition. Closure 22 is freed accordingly from the forming core and resumes its FIG. 1 formed configuration wherein its skirt is in generally orthogonal relation to the closure top panel.

Closure 22 includes a sealing member interiorly thereof, such as is indicated in preferred form at 22f in FIG. 6 and forming core 12 includes a recess in its upper surface for the purpose of forming such sealing member. As illustrated, sealing member 22f is in the form of a cone extending downwardly from top panel undersurface 22a and having a radial flare increasing with its extent along the closure central axis A.

Figure 8:
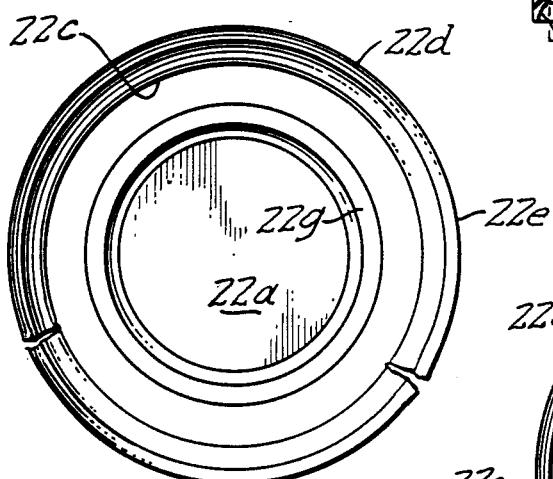
FIG. 8 is a repeat showing of FIG. 7, however, with the closure removed from the bottle neck and exhibiting disruption.
Figure 7:
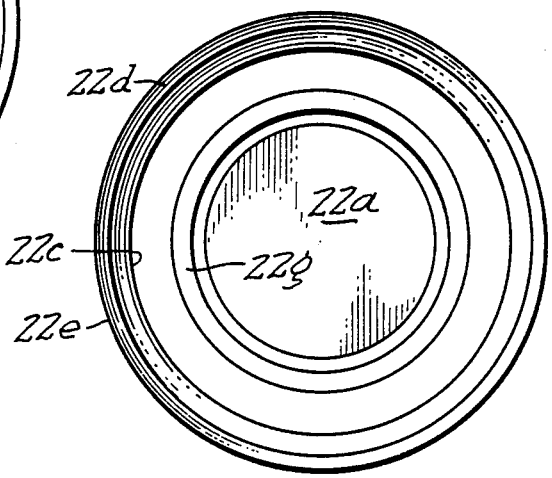
FIG. 7 is a bottom plan elevation of the FIG. 5 closure.

Referring to FIG. 8, closure 22 is illustrated in bottom plan view, exhibiting evidence of its removal from a container, skirt taper 22d being disrupted in the course of removal. As will be appreciated, such disruption, which occurs during the time in which the closure bead 22c is displaced radially outwardly over the top of the neck of the container (FIG. 6), is a random disruption and differs from closure to closure, however, always occurring and being evidenced in the taper 22d.

While in the particularly illustrated preferred practice, the stripper plate is configured with a conical outer surface to define an interior taper as the closure second interior surface, contiguous with the closure first interior surface otherwise formed by forming core 12, other configurations will now be evident to those skilled in the art, given applicants' teaching herein. Various other changes in configuration and modifications in practice are within the scope of the invention. Accordingly, it is to be understood that the foregoing preferred embodiment of making apparatus and closure and methods described and discussed in detail are intended in an illustrative and not in a limiting sense. The true spirit and scope of the invention is set forth in the following claims.

What is claimed is:

1. A method for making a container closure of type having a top panel and a skirt depending from said top panel, comprising the steps of:
   (a) configuring a forming core with exterior surface defining first interior surface of said closure, said core exterior surface including a circumferential indentation for defining a bead in such first interior surface of said closure;
   (b) encircling said core with a stripper plate, said stripper plate being configured to define second interior surface of said closure continuous with said first interior surface thereof;
   (c) configuring a molding housing to have interior surface corresponding to the exterior surface of said closure and to be engageable with said stripper plate and to be cooperative with said stripper plate and said forming core to define therewith a molding cavity for said closure;
   (d) placing said stripper plate and said molding housing in engagement with said stripper plate encircling said forming core, and injecting molding material into said cavity to form said closure on said core;
   (e) removing said molding housing from engagement with said stripper plate to expose such formed closure for removal from said core; and
   (f) displacing said stripper plate relative to said forming core and thereby displacing said skirt of said closure radially outwardly to release said bead from said forming core indentation.

2. The method claimed in claim 1 wherein said stripper plate is configured with a conical outer surface to define an interior taper as said closure second interior surface.

3. The method claimed in claim 2 wherein said stipper plate so encircles said forming core as to place such conical outer surface of said stripper plate contiguously with said forming core exterior surface.

4. The method claimed in claim 1 wherein said forming core exterior surface further includes a portion for forming a sealing member in said closure.

5. The method claimed in claim 4 wherein said forming core exterior surface includes a conical recess at an end of said forming core to form a conical sealing member in said closure.

* * * * *